(12) United States Patent
Ross et al.

(10) Patent No.: US 9,990,296 B2
(45) Date of Patent: Jun. 5, 2018

(54) SYSTEMS AND METHODS FOR PREFETCHING DATA

(71) Applicant: Oracle International Corporation, Redwood City, CA (US)

(72) Inventors: Natalie Ross, Louisville, CO (US); Peter Dunlap, Boulder, CO (US); Roch Bourbonnais, Cornec (FR); Blaise Sanouillet, Rickmansworth (GB)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 360 days.

(21) Appl. No.: 14/815,636

(22) Filed: Jul. 31, 2015

(65) Prior Publication Data

US 2017/0031823 A1   Feb. 2, 2017

(51) Int. Cl.
*G06F 12/0862* (2016.01)

(52) U.S. Cl.
CPC .. *G06F 12/0862* (2013.01); *G06F 2212/1024* (2013.01); *G06F 2212/6022* (2013.01)

(58) Field of Classification Search
CPC ......... G06F 12/0862; G06F 2212/1024; G06F 2212/6022
See application file for complete search history.

(56) References Cited

U.S. PATENT DOCUMENTS 8,103,832 B2 * 1/2012 Gara .................... G06F 12/0862
711/118
2017/0031828 A1   2/2017 Dunlap et al.

OTHER PUBLICATIONS

T. F. Wenisch, M. Ferdman, A. Ailamaki, B. Falsafi, and A. Moshovos. Making address-correlated prefetching practical. Mar. 15, 2010, IEEE Micro 2010, pp. 50-59.*

* cited by examiner

*Primary Examiner* — Eric Cardwell
(74) *Attorney, Agent, or Firm* — Kilpatrick Townsend & Stockton LLP

(57) ABSTRACT

Implementations described and claimed herein provide systems and method for prefetching data. In one implementation, whether a read request for a first data block is part of a sequential access stream is determined. A first trigger for a subsequent data block in the sequential access stream is recorded. A first set of data blocks is prefetched. The first set of data blocks is defined by a first prefetch window associated with the first trigger. A second trigger is recorded for a second subsequent data block in the sequential access stream. A second set of data blocks is prefetched. The second set of data blocks is defined by a second prefetch window associated with the first trigger. A size of the prefetch windows may be dynamically adjusted based on resource contention with the prefetching.

20 Claims, 14 Drawing Sheets

SYSTEMS AND METHODS FOR PREFETCHING DATA

TECHNICAL FIELD

Aspects of the present disclosure relate to data storage systems, and in particular, to systems and methods for prefetching data from slower storage media into faster storage media, including trigger based sequential prefetching and adaptive prefetching based on a resource contention and/or application requirements.

BACKGROUND

The continuous expansion of the Internet, the expansion and sophistication of enterprise computing networks and systems, the proliferation of content stored and accessible over the Internet, and numerous other factors continue to drive the need for large sophisticated data storage systems. Consequently, as the demand for data storage continues to increase, larger and more sophisticated storage systems are being designed and deployed. Many large scale data storage systems utilize storage appliances that include arrays of storage media. Typically, these storage systems include a file system for storing and accessing files. In addition to storing system files (e.g., operating system files, device driver files, etc.), the file system provides storage and access of user data files. For a user to access a file, one or more input/output (I/O) requests are generated to retrieve data blocks associated with the file. Any time an I/O operation is performed, a processing speed of the storage system is impacted as the requested data is retrieved from the storage media. Depending on a type of storage media storing the requested data, there is an increased latency in fulfilling an I/O request. For example, retrieving data from cache memory is faster than retrieving data from random access memory (RAM), which is faster than retrieving data from persistent storage media, such as spinning disks.

To reduce latency in fulfilling I/O requests, data blocks may be prefetched from slower storage media into faster storage media in anticipation of the data blocks being requested later as part of an access pattern. Stated differently, if a file system can predict which data blocks will be requested by identifying an access pattern, the data blocks may be retrieved from slower storage media into faster storage media, so that they are available in the faster storage media when requested. Identifying access patterns, however, is complicated and generally involves considerable overhead. For example, conventional prefetching mechanisms often involve the tracking of significant state about each active access stream, increasing complexity and the incidence of mistakes. Additionally, when a user is accessing a file sequentially, the I/O requests may not be received in a sequential order. In this case, many conventional prefetching mechanisms fail to recognize the sequential access stream. These challenges are further exacerbated with the existence of concurrent sequential access streams. Many conventional prefetching mechanisms limit a number of concurrent sequential streams due to the high overhead in maintaining stream state.

In addition to the challenges associated with identifying access streams and prefetching data accordingly, availability of data blocks in faster storage media, such as cache memory, must compete with memory pressures. Stated differently, if too much data is prefetched, the cache becomes polluted with data that may never be accessed, and prefetch data competes with other data being accessed in the cache. On the other hand, if data is being accessed faster than it is prefetched, the user may experience an increased latency.

It is with these observations in mind, among others, that various aspects of the present disclosure were conceived and developed.

SUMMARY

Implementations described and claimed herein address the foregoing problems by providing systems and methods for adaptive trigger based sequential prefetching. In one implementation, whether a read request for a first data block issued from a user device and received at a storage device over a network is part of a sequential access stream is determined. A first trigger for a subsequent data block in the sequential access stream is recorded. A first set of data blocks is prefetched from slower storage media of the storage device to faster storage media of the storage device. The first set of data blocks is defined by a first prefetch window associated with the first trigger. A second trigger is recorded for a second subsequent data block in the sequential access stream. A second set of data blocks is prefetched from the slower storage media to the faster storage media. The second set of data blocks is defined by a second prefetch window associated with the first trigger.

In another implementation, a request to prefetch a set of data blocks defined by a prefetch window to faster storage media in a storage device from slower storage media in the storage device is received. The prefetch request is associated with a read request from a user device to the storage device over a network for a data block having a trigger associated with the prefetch window. Feedback about a size of the prefetch window is generated based on resource contention in the storage device. A size of the prefetch window is dynamically adjusted based on the feedback, and a stability period is provided.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for adaptive trigger based sequential prefetching. In one aspect, a storage device stores data in a hierarchical structure with data needed for quick access stored in faster storage media and other data stored in slower storage media. To ensure that needed data is available in the faster storage media, the storage device predicts which data blocks will be requested and move the data blocks from the slower storage media into the faster storage media before the data blocks are requested to reduce perceived latency. To predict which blocks will be accessed, the storage device identifies whether the data requested is part of an access stream, such as a sequential access stream, using a sequence of triggers. For example, the storage device may maintain a hash table of prefetch triggers defining block locations at which to initiate a prefetch of one or more data blocks. When a miss occurs during a lookup of the hash table, the storage device records a trigger in the hash table for a subsequent block. If the subsequent block is requested, the storage device matches the request to the trigger recorded in the hash table and prefetches a subset of blocks defined in a prefetch window associated with the trigger. The storage device further records a subsequent trigger in the hash table for the first block in the newly prefetched window. As more blocks are matched to triggers, the storage device gains confidence that the data is being accessed in a sequential access stream and increases a size of the prefetch window with each trigger.

In another aspect, the storage device balances the availability of data in the faster storage media with a capacity of the faster storage media. Stated differently, the storage device prevents prefetched data from competing with demand data that is being accessed by a user and causing cache pollution, while ensuring that prefetched blocks are available when requested and not evicted beforehand. To achieve this balance, the storage device generates feedback on resource contention and/or application requirements. Based on the feedback, the storage device dynamically adapts a size of the prefetch window for subsequent triggers. The feedback may be generated based on a threshold capacity of the faster storage media, a size of an I/O queue to the slower storage media, a comparison of an application read rate to a currently achievable prefetch rate, and/or the like.

Figure 1:
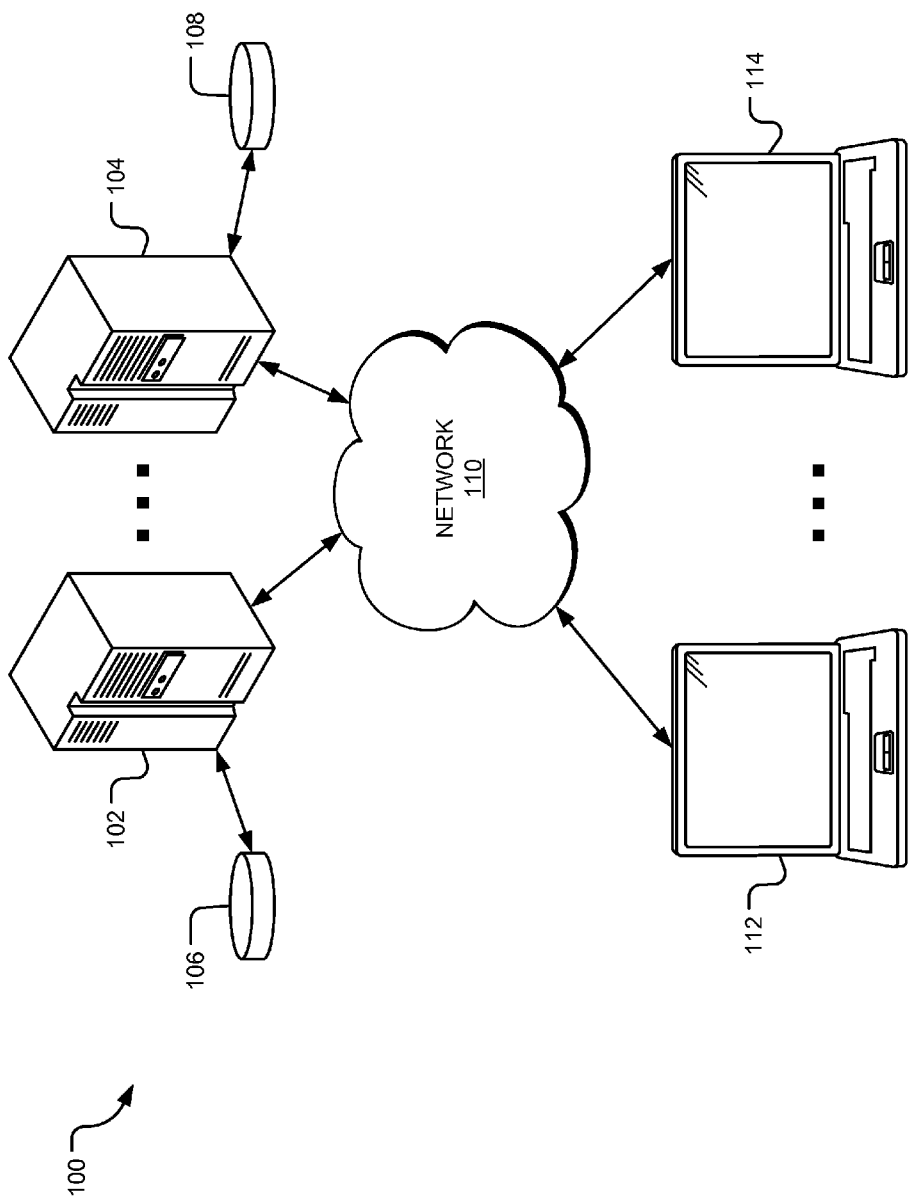
FIG. 1 is an example storage system configured to access data from one or more storage devices with trigger based sequential prefetching and to adapt the prefetching based on resource contention.

To begin a detailed description of an example storage system 100 configured to access data from one or more storage devices with trigger based sequential prefetching and to adapt the prefetching based on resource contention, reference is made to FIG. 1. As can be understood from FIG. 1, the example storage system 100 includes one or more storage devices 102-104, each managing the storage of data on storage media 106-108, which may involve spinning media (e.g., disk drives) as well as various forms of persistent memory, such as solid state memory. The storage devices 102-104 may each store data in a hierarchical structure with data for which quick access is needed stored in faster storage media (e.g., one or more levels of cache memory) and other media stored in slower storage media, such as disk drives.

The storage devices 102-104 may each be, without limitation, a storage appliance, including a file-level storage server providing data access over a network 110 to one or more user devices 112-114 on a client network. Such a storage appliance may be, for example, a ZFS storage appliance, which is a combined file system and volume manager designed by Sun Microsystems® in 2005 and now expanded and advanced by Oracle® that allows for data integrity verification and repair, high storage capacities, along with numerous other features and advantages. Although discussed herein in the context of ZFS storage appliance, it will be appreciated that the storage devices 102-104 may each be any storage device.

In one implementation, the storage devices 102-104 on a storage network may be accessible by the user devices 112-114 on the client network over the network 110. It will be appreciated, however, that the various networks may comprise an integrated network, and the connections discussed herein between the networks represent but one possible network topology. The various networks may also be local in nature or geographically dispersed, such as with large private enterprise networks or the Internet. The user devices 112-114 are generally any form of computing device capable of interacting with the network 110, such as a terminal, a workstation, a personal computer, a portable computer, a cellphone, a mobile device, a tablet, a multimedia console, and the like. In some implementations, the client network includes one or more user interfaces, including, for example, a business user interface (BUI), permitting a user to interact with a storage device to access data.

ZFS based systems utilize a storage pool layer having one or more storage pools (often referred to as "zpools") comprising virtual devices (vdevs) constructed of block devices, such as the storage media 106-108. A block device is any device that moves data in the form of blocks, which may be, without limitation, hard disk drives, solid state drives, optical drives, magnetic drives, and other addressable regions of memory. A ZFS volume is a dataset that represents a single block device. A virtual device may span a number of block devices or volumes, and a storage pool may include one or more virtual devices, each including one or more partitions of storage media or one or more storage media.

Traffic to and from the storage devices 102-104 is typically managed by one or more dedicated storage servers located within the storage devices 102-104 or a storage network. A common protocol employed by storage appliances for accessing content, including files, directories, and their associated metadata is a Network File System (NFS). NFS is a widely used distributed file system protocol, originally developed by Sun Microsystems® in 1984 and currently in version 4 (NFSv4) from Oracle®. NFS allows the client network to access stored data seamlessly by providing a programming interface permitting the user devices 112-114 to: create and delete files; read and write files; perform seeks within a file; create and delete directories; manage directory contents; and perform other file, directory, or content operations. The operating system utilized by the user devices 112-114 is configured to communicate with the NFS programming interface to manage the file system and the interaction between executing applications with data residing in the storage devices 102-104. Generally, NFS systems manage file system metadata and provide access to files and directories. The metadata describes the location of the files and directories on the storage media 106-108.

In one implementation, the storage devices 102-104 predict which data blocks will be requested by the user devices 112-114 and move the data blocks from slower storage media (e.g., disks) into faster storage media (e.g., cache) before the data blocks are requested to reduce latency from the perspective of the user devices 112-114. Aggregation of sequential I/O requests to the slower storage media results in faster more efficient access patterns, and the associated data blocks may be prefetched into faster storage media in the background prior to when the data blocks are needed by the user devices 112-114.

To predict which blocks will be accessed, the storage devices 102-104 identify whether the data requested is part of an access stream, which is an access pattern of the order in which data blocks are accessed for a single application. The user devices 112-114 may utilize various types of access streams depending on the activity and/or data requested. For example, the user devices 112-114 may access data blocks with a random access stream, a sequential access stream, a strided access stream, a reverse sequential access stream, a reverse strided access stream, and/or the like. A random access stream involves the access of data blocks in a random pattern (e.g., 1, 2, 4, 8, 7, 3, 0, 5, 6, 9). A sequential access stream has an access pattern laid out contiguously in virtual address space (e.g., 0, 1, 2, 3, 4, 5, 6, 7, 8, 9), while a reverse sequential access stream accesses the blocks in a reverse order from the sequential access stream. A strided access stream has an access pattern separated by a constant stride (e.g., 0- -1- -2- -3- -4 . . . ), and a reverse strided access stream accesses the blocks in a reverse order from the strided access stream.

Identifying multiple different access stream types is generally overly complicated and involves a large overhead in executing prefetch systems and methods, which are called for every block read in the storage devices 102-104. In one implementation, the storage devices 102-104 each maintain a hash table of prefetch triggers at which to initiate a prefetch of one or more data blocks, thereby reducing overhead to a hash lookup to determine whether the requested block has a trigger. The storage devices 102-104 thus store a minimal amount of state in the form of a trigger at a location of a next prefetch in an access stream. Stated differently, the storage devices 102-104 do not store history information for an access stream, thereby minimizing complexity of prefetching. Moreover, a number of concurrent streams is limited only by a size of the hash table.

While prefetching may be performed based on various access stream types, in one implementation, the storage devices 102-104 prefetch data from slower storage media into faster storage media based on sequential access streams. The storage devices 102-104 in this implementation identify sequential access streams for order accesses and out-of-order accesses. In other words, where one of the user devices 112-114 is reading a file or volume sequentially over the network 110, the I/O request may not be received by the storage device 102 or 104 in exactly sequential order. Rather than dropping the access pattern like conventional systems and methods, the storage device 102-104 recognize the sequential access stream and continue prefetching accordingly.

In one implementation, the storage device 102, for example, maintains a hash table of prefetch triggers at which to kickoff prefetching. When a miss occurs during a lookup of the hash table, the storage device 102 records a trigger in the hash table for a subsequent block. If the subsequent block is requested by the user device 112, the storage device 102 matches the request to the trigger recorded in the hash table and prefetches a subset of blocks defined in a prefetch window. The storage device 102 further records a subsequent trigger in the hash table for the block in the first sequential position of the prefetch window. As more blocks are matched to triggers, the storage device 102 gains confidence that the user device 112 is accessing data in a sequential access stream and increases a size of the prefetch window with each trigger. For example, the number of blocks defined in the prefetch window may be doubled with each trigger.

Generally, the storage devices 102-104 balances the availability of data in faster storage media with a capacity of the faster storage media. Stated differently, the storage devices 102-104 prevents prefetched data from competing with demand data (i.e., data being accessed by the user devices 112-114) and causing cache pollution, while ensuring that prefetched blocks are available when requested and not evicted beforehand. In one implementation, the storage devices 102-104 generate feedback on resource contention to determine when prefetched data is consuming too much capacity of the faster storage media and/or the faster storage media otherwise lacks capacity. Based on the feedback, the storage devices 102-104 dynamically adapt a size of the prefetch window for subsequent triggers. The feedback may be generated based on a threshold capacity of the faster storage media, a size of an I/O queue to the slower storage media, a comparison of a read rate to a prefetch rate, and/or the like.

In one implementation, the storage devices 102-104 generate feedback based on a threshold capacity of the faster storage media. If a size of prefetched data stored in the faster storage media exceeds the threshold, the storage device 102, for example, globally throttles prefetching by adjusting a maximum prefetch window size. Thus, the storage device 102 continues prefetching data for an access stream into the faster storage media with an increasing prefetch window size until the maximum prefetch window size is reached. The storage device 102 then provides a stability period to analyze an impact of the adjusted maximum prefetch window size on the memory capacity of the faster storage media and generates feedback for further adjustments, as needed based on resource contention. Dynamically adjusting the prefetch window based on the a capacity of the faster storage media prevent cache pollution while ensuring that prefetched data is not evicted from the faster storage media before being accessed by the user devices 112-114.

In another implementation, the storage devices 102-104 generate feedback based on a size of an I/O queue expressed in seconds. Where I/O requests associated with prefetching access stream(s) represent more than a threshold of activity of the I/O queue or more activity than can be handled by the slower storage media, the storage device 102, for example, globally throttles prefetching by adjusting a maximum prefetch window size based on a calculated overage of requests in the I/O queue. The storage device 102 then provides a stability period to analyze an impact of the adjusted maximum prefetch window size on the I/O queue of the slower storage media and generates feedback for further adjustments, as needed based on the size of the I/O queue. Dynamically adjusting the prefetch window based on the size of the I/O queue reduces the memory footprint for prefetching while maintaining maximum throughput of the slower storage media, allowing the faster storage media to concentrate on other data.

In another implementation, the storage devices 102-104 generate feedback based on a comparison of a read rate to a prefetch rate. The prefetch window is dynamically adjusted with each trigger to minimize a difference between the rate at which the prefetched blocks are accessed (i.e., the read rate) and the rate at which the blocks are prefetched from the slower storage media to the faster storage media. The storage devices 102-104 thus prefetch data only as aggressively as needed to conserve resources for other more read-intensive applications. Dynamically adjusting the prefetch window based on the comparison of the read rate to the prefetch rate increases an overall system efficiency.

These implementations are examples of how the storage devices 102-104 dynamically adapt prefetching to optimize system performance, particularly when resources are scarce, and to prioritize demand reads over prefetch I/O requests as needed. If the storage devices 102-104 prefetch data too aggressively and the faster storage media is reaching capacity, prefetch data may be prematurely evicted from the faster storage media, resulting in the same data being requested multiple times with additional I/O requests to the slower storage media. Additionally, if the slower storage media is overwhelmed with prefetch I/O requests, some of these requests may become prioritized in an I/O queue and compete with demand I/O requests. Further, if data is prefetched with statically defined prefetch window sizes, the storage devices 102-104 may either fail to be responsive to requests from the user devices 112-114 and/or consume more system resources than necessary. The storage devices 102-104 address these concerns by dynamically adjusting the prefetch window based on resource contention.

Figure 2:
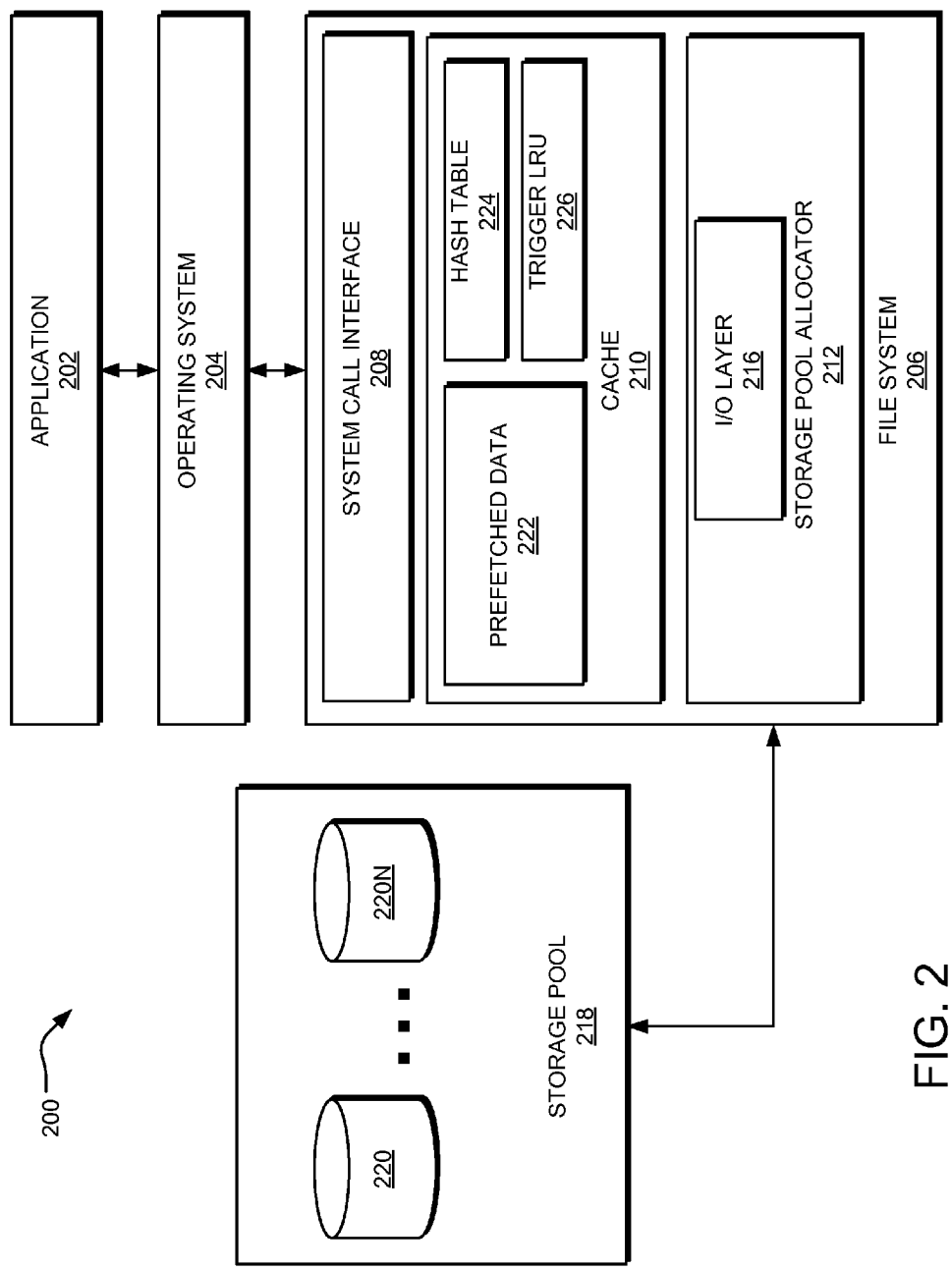
FIG. 2 is an example network file system implementing adaptive trigger based prefetching systems and methods.

Turning to FIG. 2, an example network file system 200 implementing adaptive trigger based prefetching systems and methods is shown. In one implementation, the system 200 includes an application 202 interfacing with an operating system 204. The operating system 204 includes functionality to interact with a file system 206, which in turn interfaces with a storage pool 218. The operating system 204 typically interfaces with the file system 206 via a system call interface 208. The operating system 204 provides operations for users to access files within the file system 206. These operations may include read, write, open, close, and/or the like. In one implementation, the file system 206 is an object-based file system (i.e., both data and metadata are stored as objects). More specifically, the file system 206 includes functionality to store both data and corresponding metadata in the storage pool 218.

In one implementation, the storage pool 218 comprises virtual devices constructed of block devices 220-220N. A block device is any device that moves data in the form of blocks, which may be, without limitation, hard disk drives, solid state drives, optical drives, magnetic drives, and other addressable regions of memory. A volume is a dataset that represents a single block device. A virtual device may span a number of block devices or volumes, and the storage pool 218 may include one or more virtual devices, each including one or more partitions of storage media or one or more storage media. A virtual device may span a number of block devices or volumes, and the storage pool 218 may include one or more virtual devices, each including one or more partitions of storage media or one or more storage media. Each block may be described by a block id (i.e., the number of the block within a file or object). The block id is then mapped to a data virtual address (DVA), which maps to a specific location on disk in the storage pool 218 and is described by an offset.

The file system 206 may store data in a hierarchy to optimize performance while reducing monetary cost. Thus, in one implementation, the file system 206 includes one or more hierarchical levels of cache 210. A higher level of the cache 210 may correspond to any tangible storage medium that stores data, and may be a volatile storage media such as direct random access memory ("DRAM"). Certain data, such as frequently-accessed or recently-accessed data, that speeds up the operation of the file system 206 during I/O requests may be stored in the higher level of the cache 210. In one implementation, the higher level of the cache 210 uses a variant of an Adaptive Replacement Cache ("ARC") algorithm, as described with respect to FIG. 8. Data allowing for relatively slower access, such as data less frequently or recently used, may be stored in a lower level of the cache 210, with data allowing for even slower access being stored in the storage pool 218. The lower level of the cache 210 may be persistent non-volatile storage, with each level of the cache 210 comprising faster memory and/or storage devices relative to the storage pool 218. In one implementation, the lower level of the cache 210 comprises flash memory based solid state disks.

In one implementation, operations provided by the operating system 204 correspond to operations on objects. Stated differently, a request to perform a particular operation (i.e., a transaction) is forwarded from the operating system 204, via the system call interface 208, to a data management unit (not shown). In one implementation, the DMU translates the request to perform an operation on an object directly to a request to perform a read operation (i.e., an I/O request) at a physical location within the storage pool 218. A storage pool allocator (SPA) 212 receives the request from the DMU and reads the blocks from the storage pool 218. In one implementation, the SPA 212 includes an I/O layer 216 and other modules, which may be used by the SPA 212 to read data from the storage pool 218. In one implementation, the I/O layer 216 receives I/O requests and groups the I/O requests into transaction groups for processing.

As discussed herein, reading data from the cache 210 is faster than reading data from the storage pool 218. If data requested by the operating system 204 is stored in the storage pool 218, the time spent waiting for the file system 206 to respond to the request may be lengthy. As a result, with users issuing many requests for data at any given time, system performance would be greatly reduced. Accordingly, to increase efficiency, the file system 206 may identify access streams and prefetch data associated with the access streams into the cache 210, such that prefetched data 222 associated with the access streams is available faster in the cache when requested by the operating system 204.

In one implementation, the file system 206 maintains a hash table 224 of triggers stored in the cache 210. Each of the triggers may comprise a hash including block identifying information, such as the block id and/or the offset. To determine whether an I/O request for a block of data corresponds to a preexisting access stream, the file system 206 compares block identifying information for the requested block to the hash table. If there is a match in the hash table 224, the requested block has an associated trigger, and a preexisting access stream is in progress. The requested block and a subsequent subset of blocks defined by a prefetch window associated with the trigger is moved to the cache 210 if they are not already stored in the cache 210 with the prefetched data 222.

To ensure that the hash table 224 is not storing outdated triggers for blocks no longer associated with a preexisting access stream, a trigger least recently used (LRU) list 226 may be maintained in the cache 210 in preparation of eviction from the cache 210. The LRU list 226 includes each of the triggers maintained in the hash table 224. The LRU 226 is consulted after a first predefined time elapses to determine if any triggers have aged out and need eviction, and if any trigger has been in the LRU 226 longer than a second predefined time, the trigger is evicted from the cache 206. As an example, the first predefined time may be two seconds, and the second predefined time may be ten seconds. It will be appreciated, however, that other periods of time may be used. Further, other cache replacement policies or other background threads may be implemented for evicting aged triggers from the hash table 224.

If there is no match in the hash table 224 during the hash lookup for a requested block, the requested block may correspond to a random access stream or may be a start of a new sequential access stream. To determine whether a new sequential access stream has been initiated and to have blocks of data associated with the potential new sequential access stream accessible from the cache 210, the file system 206 records a trigger in the hash table 224 for a a subsequent block (e.g., a next sequential block following the requested block). The trigger will define an initial prefetch window specifying a first subset of blocks. If the operating system 204 requests the subsequent block, there will be a match with the hash table 224, and the first subset of blocks will be moved into the cache 210 and stored with the prefetched data 222. After the trigger is matched, a subsequent trigger is recorded in the hash table 224 for a first sequential block of the initial prefetch window. Stated differently, the subsequent trigger is recorded to prefetch another subset of blocks starting at the beginning of the previously prefetched segment. Moving blocks associated with the sequential access stream into the cache 210 for storage with the prefetched data 222 generally involves a sequences of triggers, each initiating a prefetch of a number of blocks defined by a prefetch window.

Each time a trigger is matched, the file system 206 gains confidence that the operating system 204 is requesting blocks in a sequential access stream. Thus, a size of the prefetch window may increase by a predefined factor with each trigger until a maximum window size is reached. For example, the size of the prefetch window may double until the maximum window size is reached. The maximum window size may be preset based on a size of the record associated with the sequential access stream. In one implementation, the maximum window size is calculated using the record size multiplied by a target of blocks (e.g., 256 blocks). For example, a default record size is 128 KB with 256 blocks of data. Using this information, the maximum window size may be preset at 32 MB. This may be too high of a maximum window size for a smaller record, however, because it can cause a flood of small I/O requests to the storage pool 218, thus overwhelming the backend of the system 200 unnecessarily. On the other hand, having the maximum window size preset too low may result in an inability to maintain prefetching ahead of an application read stream. As such, the file system 206 may preset a minimum prefetch window, for example, at 4 MB.

A sequential access stream prefetched as detailed herein involves an ongoing sequence of triggers and the retrieving of the blocks defined by the associated prefetch windows into the cache 210. If the operating system 204 is requesting data in a sequential access stream, a trigger will be matched for a requested block or the requested block will be already stored with the prefetched data 222 in the cache. The file system 206 will respond to an I/O request by reading the requested block from the prefetched data 222, and if a trigger is associated with the requested block, the file system 206 will move additional blocks defined by the prefetch window of the trigger into the cache 210. The only overhead thus involves a hash lookup in the hash table 224 to determine whether there is a trigger match. Moreover, a new sequential access stream is initiated only where a trigger is not recorded in the hash table 224 at the block offset of the requested block and the requested block is not stored with the prefetched data 222. Stated differently, a new sequential access stream is identified where a requested block does not have a matching trigger recorded in the hash table 224 and the requested block is not stored in the cache 210.

If no restrictions are placed on prefetching, a size of the prefetched data 222 may consume too much of the cache 210, overwhelm the storage pool 218, and/or consume other valuable resources, as described herein. As such, the file system 206 generates feedback on the prefetching systems and methods to determine whether too many resources are consumed and throttle the prefetching back accordingly. For example, as described herein, a size of the prefetch window may be dynamically adjusted based on resource contention and/or other factors.

Figure 3:
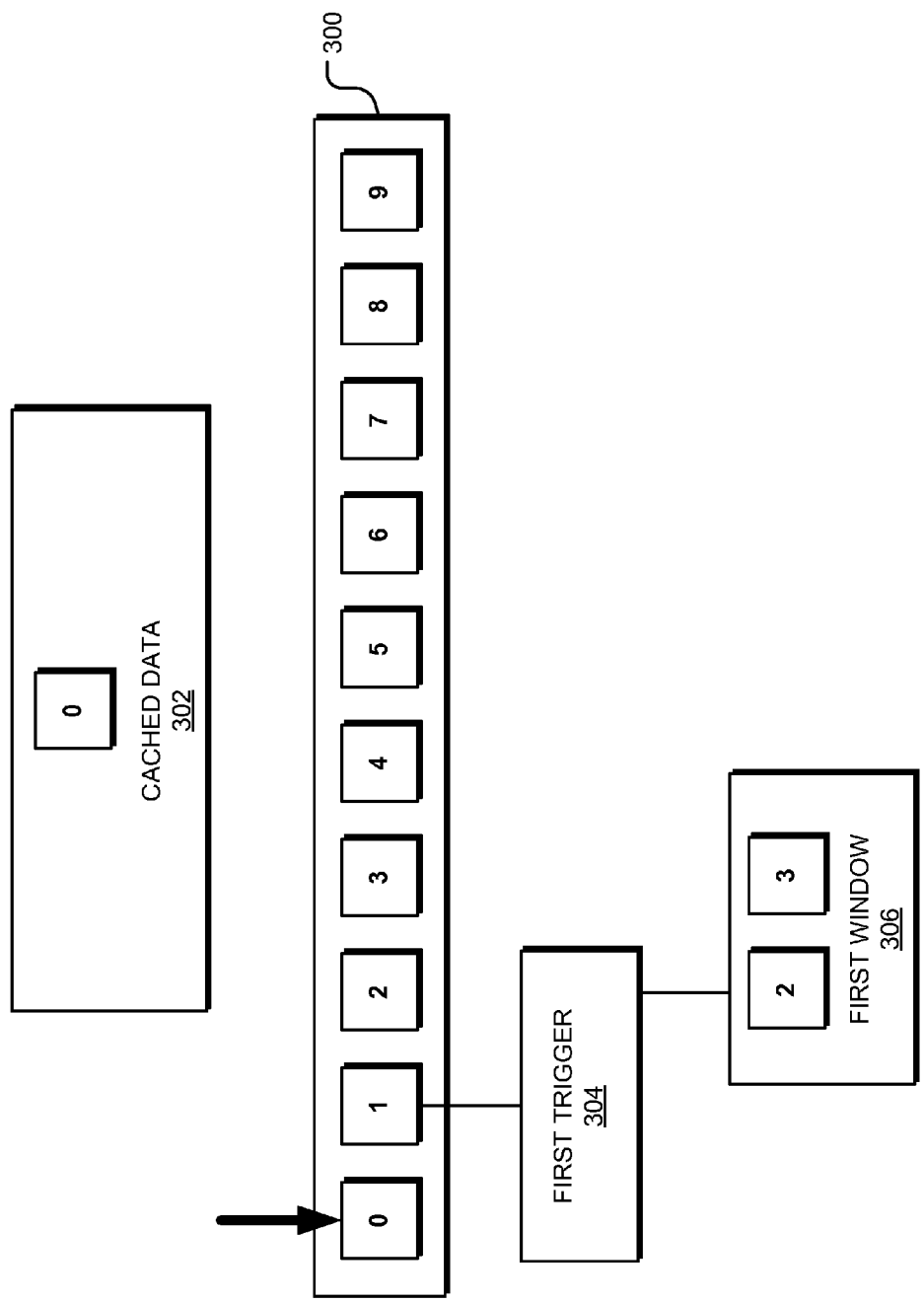
FIGS. 3-5 illustrate an example representation of a file on disk with data blocks prefetched into a cache according to a sequence of triggers.
Figure 4:
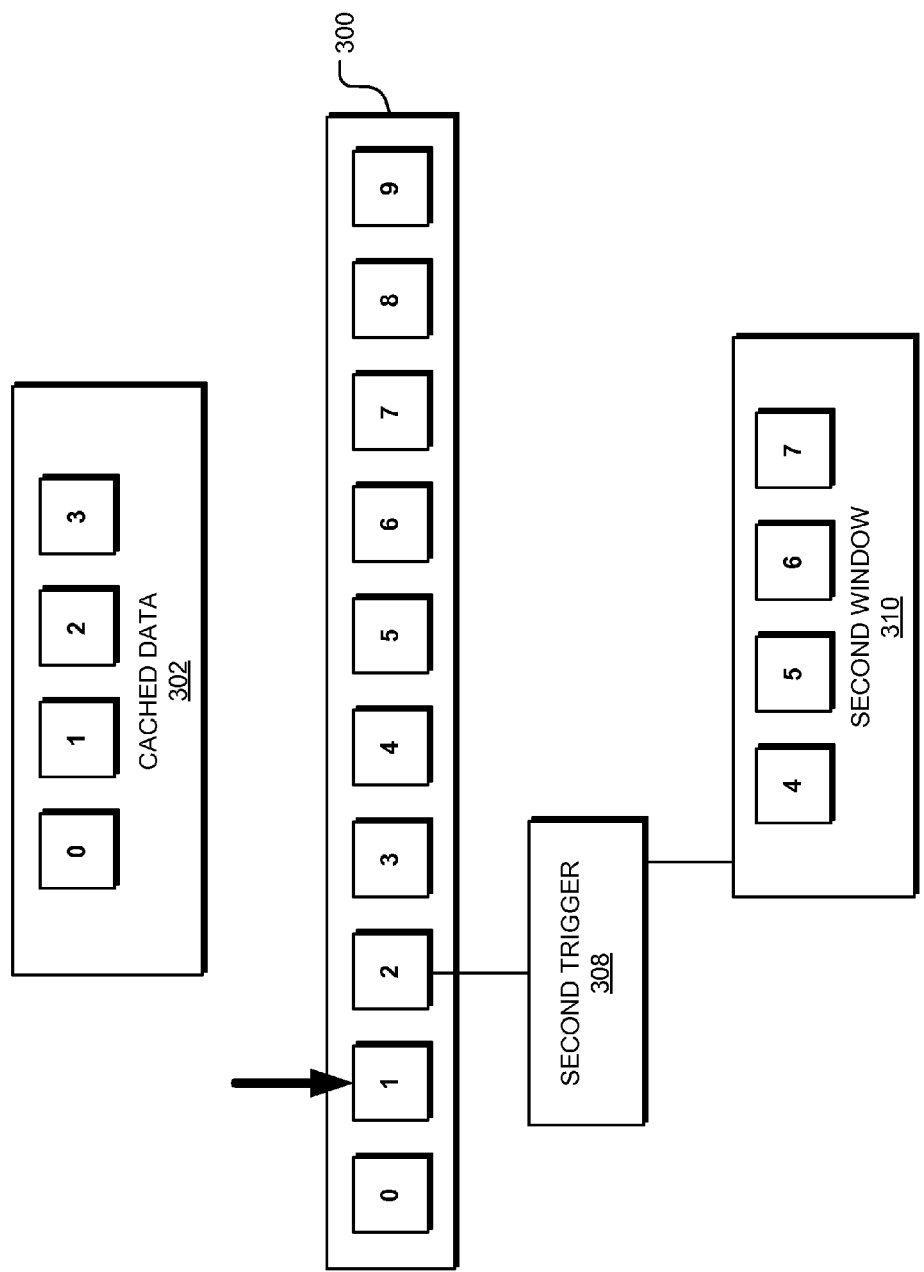
Figure 5:
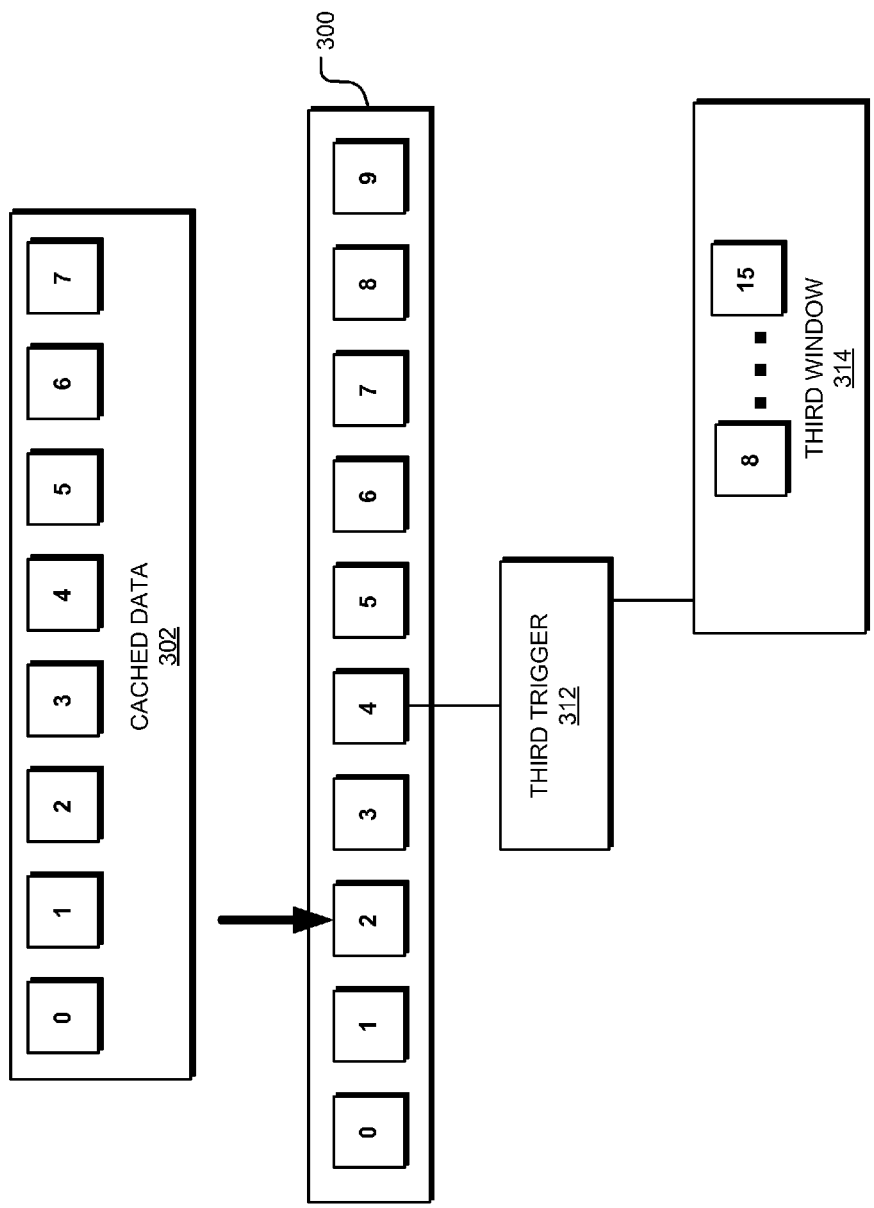

For a detailed description of an example representation of a file on disk 300 with data blocks prefetched into a cache according to a sequence of triggers, reference is made to FIGS. 3-5. In the illustrations shown in FIGS. 3-5, the bolded arrow represents the block being read from the file on disk 300.

In one implementation, a new sequential access pattern reads block 0 from the file on disk 300, as shown in FIG. 3. The request to read block 0 moves the block 0 into a cache 302 from the file on disk 300. To determine whether block 0 is being read as part of a sequential access stream, a first trigger 304 is recorded on a subsequent block (block 1). The first trigger 304 defines a first prefetch window 306 containing a subsequent segment of the potential sequential access stream (blocks 2 and 3).

Turning to FIG. 4, a request to read block 1 initiates the prefetch defined in the first prefetch window 306, moving blocks 1, 2, and 3 to the cache 302. The access of block 1 associated with the first trigger 304 means that two blocks have been accessed sequentially, and there is a potential that the file on disk 300 is being accessed with a sequential access pattern. To increase confidence that a sequential access pattern exists for the access of the file on disk 300 as well as ensure that blocks are accessible in the cache 302 before they are requested, a second trigger 308 is recorded on a second subsequent block located at the beginning of the previously prefetched segment. Here, the previously prefetched segment defined by the first prefetch window 306 included blocks 2 and 3, so the second trigger 308 is recorded for block 2. The second trigger 308 defines a second prefetch window 310 containing a second subsequent segment of the potential sequential access stream (blocks 4, 5, 6, and 7).

Turning next to FIG. 5, a request to read block 2 initiates the prefetch defined in the second prefetch window 310, moving blocks 4, 5, 6, and 7 to the cache 302. The access of block 2 associated with the second trigger 306 means that three blocks have been accessed sequentially, thereby increasing the confidence that the file on disk 300 is being accessed with a sequential access pattern. To further increase confidence that a sequential access pattern exists for the access of the file on disk 300 as well as ensure that blocks are accessible in the cache 302 before they are requested, a third trigger 312 is recorded on a second subsequent block located at the beginning of the previously prefetched segment. Here, the previously prefetched segment defined by the second prefetch window 310 included blocks 4-7, so the third trigger 312 is recorded for block 4. The third trigger 312 defines a third prefetch window 314 containing a third subsequent segment of the potential sequential access stream (blocks 8-15).

Subsequent triggers will continue being recorded and blocks being prefetched based on those triggers as the access to the file on disk 300 continues according to the sequential access stream. In one implementation, a size of the prefetch windows 306, 310, 314, and on increases by a predefined factor with each subsequent trigger as confidence that the sequential access stream exists is increased. For example, the size of the prefetch windows 306, 310, 314, and on may double, as illustrated in FIGS. 3-5, until a maximum prefetch window size is reached as described herein. Alternatively or additionally, the size of the prefetch windows 306, 310, 314, and on may be dynamically adapted based on resource contention, as described herein.

Figure 6:
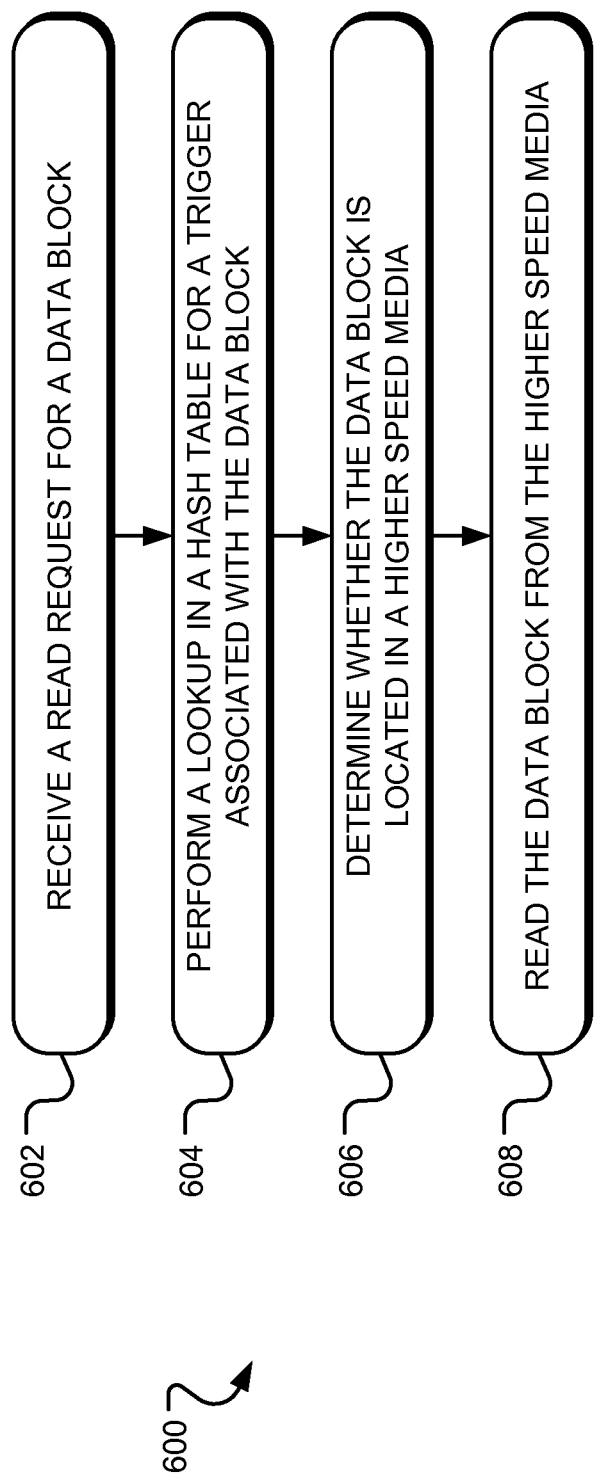
FIG. 6 illustrates example operations for identifying a preexisting sequential stream.

FIG. 6 illustrates example operations 600 for identifying a preexisting sequential stream. In one implementation, an operation 602 receives a read request for a data block, and an operation 604 performs a lookup in a hash table for a trigger associated with the requested data block.

If the operation 604 finds a match in the hash table, the read request is part of a preexisting sequential access stream, and a subsequent segment of the preexisting access stream defined by a prefetch window is prefetched into higher speed media (e.g., cache). If the operation 604 does not find a match in the hash table, the requested data block is already prefetched into the higher speed media, the read request is a start of a new sequential access stream, or the read request is part of another type of access stream, such as a random access stream.

To determine which scenario is occurring, an operation 606 determines whether the requested data block is located in the higher speed media. If the operation 606 located the requested data block in the higher speed media, the requested data block was previously prefetched into the higher speed media as part of a sequential access stream or due to an unrelated prior access of the requested data block. If the operation 606 does not locate the requested data block in the higher speed media, the read request is either for the start of a new sequential access stream or part of another type of access stream, such as a random access stream, and the requested data block is moved to the higher speed media with the read request. An operation 608 reads the requested data block from the higher speed media.

Figure 7:
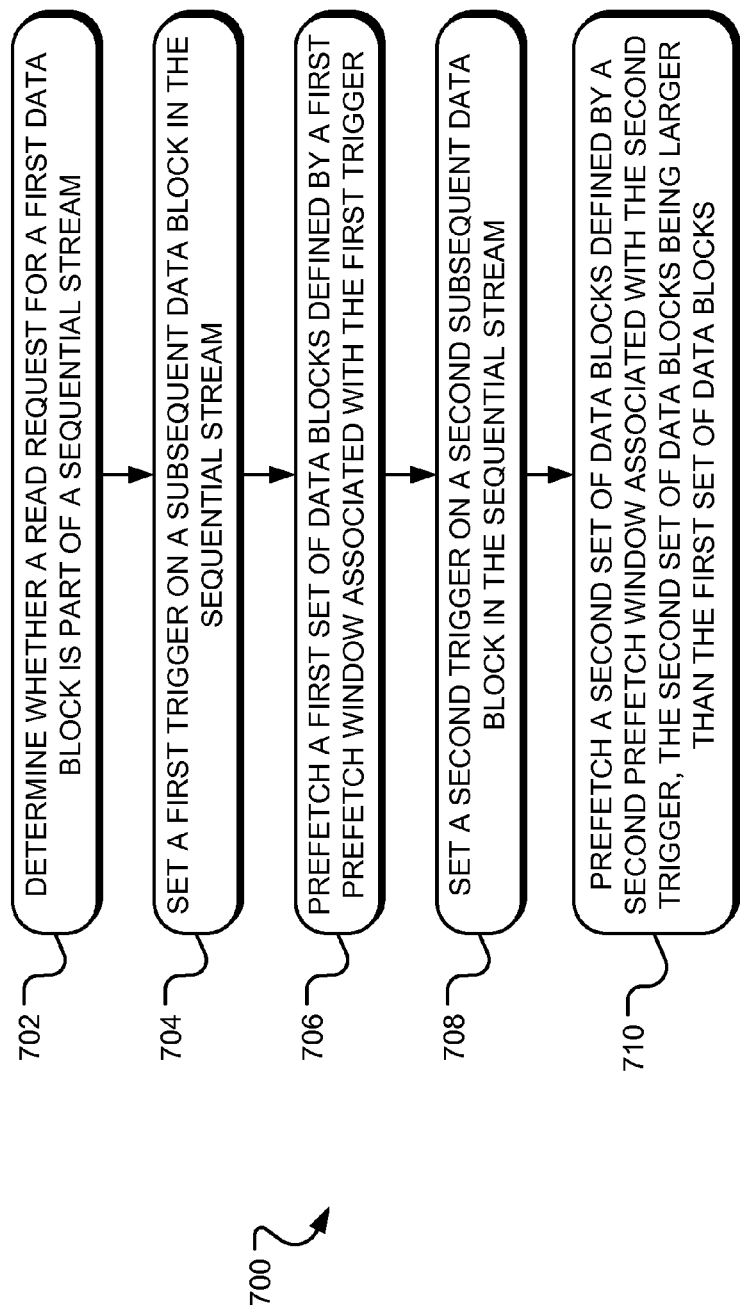
FIG. 7 illustrates example operations for prefetching data using sequential triggers.

Referring to FIG. 7, example operations 700 for prefetching data using sequential triggers are illustrated. In one implementation, an operation 702 determines whether a read request for a first data block is part of a sequential access stream, for example, using the operations 600. If the operation 702 identifies the read request as corresponding to either a start of a new sequential access stream or part of a preexisting sequential access stream, an operation 704 sets a first trigger on a subsequent data block in the sequential access stream.

Once the subsequent data block is requested, an operation 706 prefetches a first set of data blocks defined by a first prefetch window associated with the first trigger. An operation 708 sets a second trigger on a second subsequent data block in the sequential access stream. In one implementation, the second subsequent data block is located at the beginning of the first prefetch window. Once the subsequent data block is requested, an operation 710 prefetches a second set of data blocks defined by a second prefetch window associated with the second trigger. In one implementation, the second prefetch window is larger in size than the first prefetch window. The operations 702-710 may be repeated as additional portions of the sequential access stream are requested.

As described herein, one challenge associated with prefetching data from slower storage media into faster storage media involves determining how aggressively to prefetch the data and when to throttle the prefetch based on resource contention. In one implementation, feedback on resource contention is generated. Based on the feedback, a size of a prefetch window is dynamically adapted for subsequent triggers. The feedback may be generated based on a threshold capacity of the faster storage media, a size of an I/O queue to the slower storage media, a comparison of a read rate to a prefetch rate, and/or the like.

Figure 8:
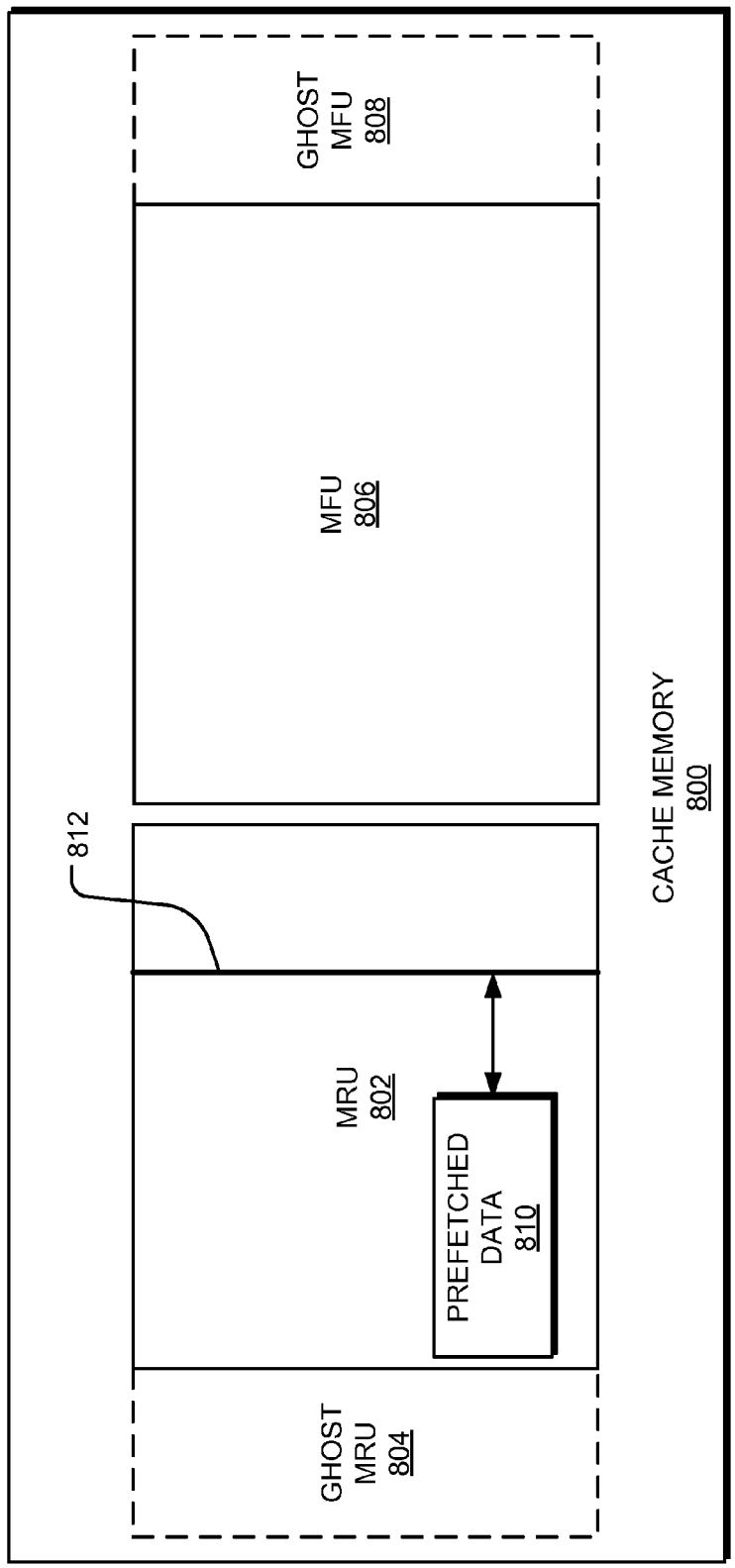
FIG. 8 is an example cache system storing prefetched data based on a threshold capacity of the faster storage media.

FIG. 8 is an example cache system 800 storing prefetched data based on a threshold capacity. In one implementation, the cache 800 uses a variant of the Adaptive Replacement Cache ("ARC") algorithm. The cache 800 maintains a cache directory split into a Most Recently Used ("MRU") list and a Most Frequently Used ("MFU") list. The MRU list is divided into two dynamic portions MRU 802 and ghost MRU 804, and the MFU list is divided into two dynamic portions MFU 806 and ghost MFU 808.

The MRU 802 and the MFU 806 are actual cache memory. The MRU 802 maintains a list of recently accessed cache entries, and the MFU 806 maintains a list of frequently accessed cache entries (i.e., entries that are referenced at least twice). The MRU 802 sorts the list based on the time of the most recent access, with new entries or cache hits at the top, pushing entries down until no free space exists in the cache 800 resulting in the bottom entry being evicted. Similarly, the MFU 806 sorts the list such that frequently accessed entries are at the top of the list, and entries that are accessed less frequently are near the bottom of the list and eventually evicted if no free space exists in the cache 800. In other words, the MRU 802 and the MFU 806 each have a target size that may be dynamically adjusted as well as a maximum size that is a percentage of the size of the cache 800. If the MRU 802 and MFU 806 are within these bounds, no evictions occur. In one implementation, if the MRU 802 reaches its target size and the MFU 806 has not reached its target size, the size of the MRU 802 may be increased at the expense of the MFU 806. Similarly, the size of the MFU 806 may be increased at the expense of the MRU 802. However, if the MRU 302 and MFU 306 reach the maximum size such that there is no free space in the cache 800, the bottom entry is evicted as new entries are added. Other ways of managing the size of each portion of the cache 800 and/or the eviction of data from the cache 800 or each portion of the cache 800 are also possible.

The ghost MRU 804 and the ghost MFU 808 each comprise a list tracking data recently evicted from the MRU 802 and the MFU 806, respectively. The ghost MRU 804 list and the ghost MFU 808 list only contain metadata (references for the evicted entries), not the cache entry itself.

In one implementation, prefetched data 810 occupies the MRU 802 until read. To generate feedback on resource contention with prefetching, a size of the prefetched data 810 that has not yet been read and thus is occupying the MRU 802 is tracked relative to a capacity threshold 812. The capacity threshold 812 may be preset to prevent the prefetched data 810 from occupying an entirety of the MRU 802 without unduly limiting prefetching into the cache 800. For example, the capacity threshold 812 may be set at three quarters of an overall capacity of the MRU 802. Limiting the size of the prefetched data 810 further prevents the prefetched data 810 from being resident in the cache 800 so long that it is evicted from the cache 800 prior to being read.

If the size of the prefetched data 810 exceeds the capacity threshold 812, prefetching may be globally throttled. In one implementation, a maximum size of a prefetch window for all prefetching is decreased by a preset factor where the capacity threshold 812 is exceeded. For example, the maximum size of the prefetch window may be halved. After adjusting the maximum size of the prefetch window, a stability period is provided to determine whether the size of the prefetched data 810 is still exceeding the capacity threshold 812. The stability period may be, for example, ten seconds. Depending on the size of the prefetched data 810 relative to the capacity threshold 812, the maximum size of the prefetch window may be increased or decreased.

Figure 9:
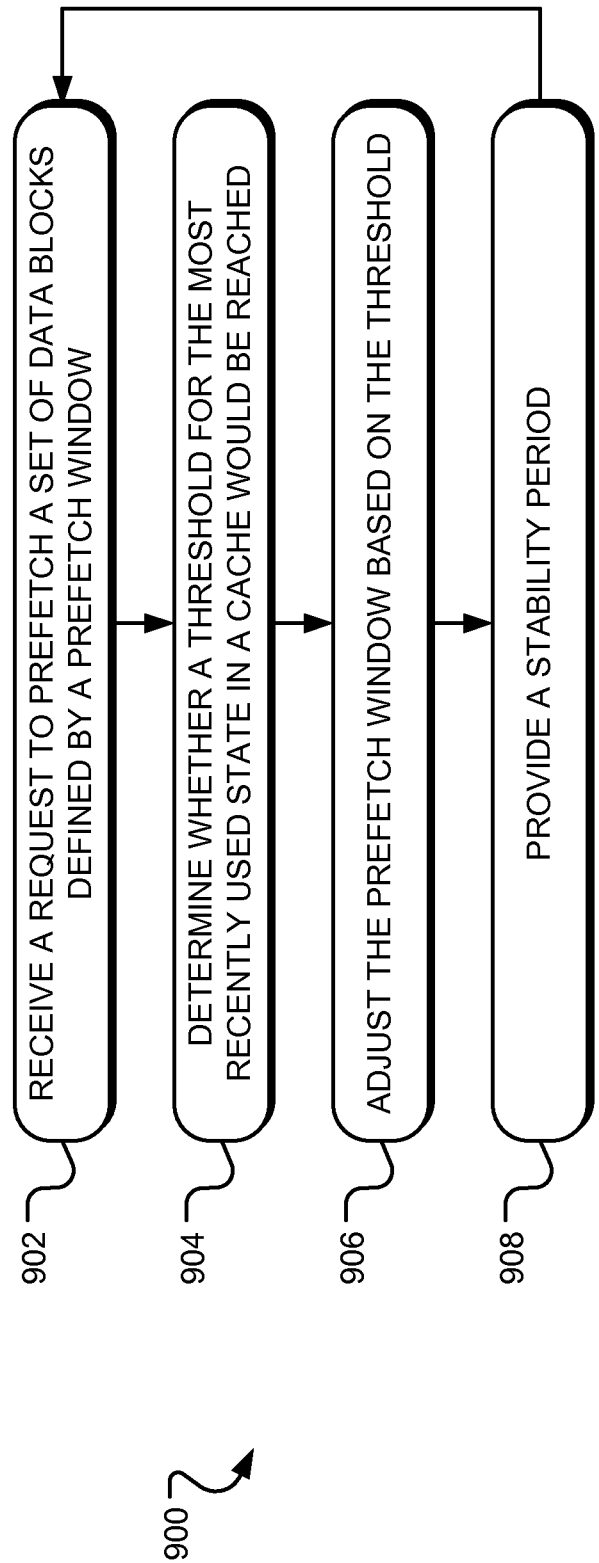
FIG. 9 illustrates example operations for adaptive prefetching based on a threshold capacity of the faster storage media.

FIG. 9 illustrates example operations 900 for adaptive prefetching based on a threshold capacity of the faster storage media. In one implementation, an operation 902 receives a request to prefetch a set of data blocks defined by a prefetch window, and an operation 904 determines whether a capacity threshold for an MRU state in a cache would be reached. An operation 906 adjusts the prefetch window based on the threshold. For example, where the capacity threshold is exceeded, the prefetch window may be halved in size. An operation 908 provides a stability period to assess an impact of the operation 906 on resource contention. The operations 904-908 may be repeated with each repeat of the operation 902.

Figure 10:
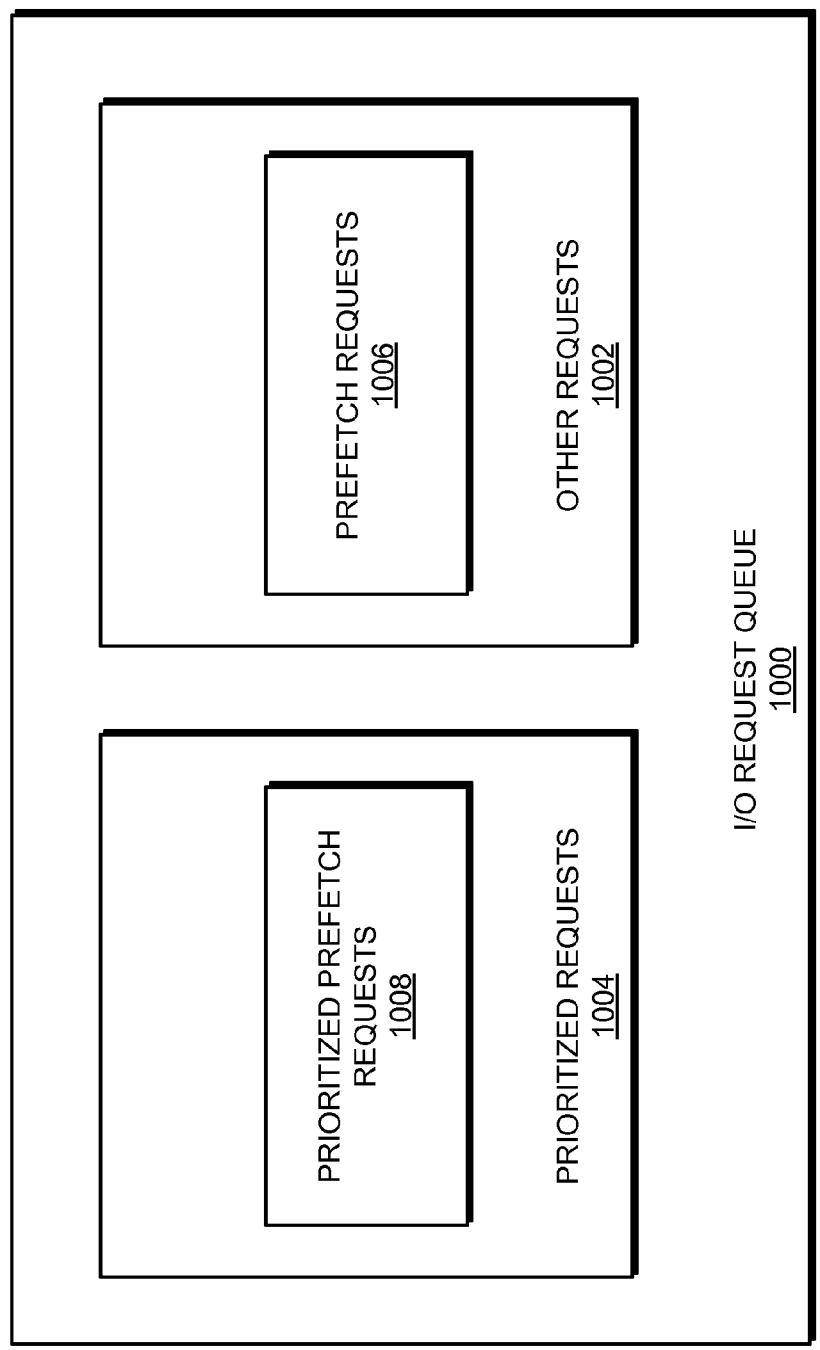
FIG. 10 shows an example input/output system for adaptive prefetching based on an input/output queue overage.

FIG. 10 shows an example input/output system for adaptive prefetching based on an input/output queue 1000 overage. In one implementation, the I/O request queue 1000 is deployed in a storage system capable of receiving requests to read data stored in slower storage media and to send data blocks associated with those requests. The I/O layer 216 may schedule read requests and interface with an I/O bus to fulfill the read requests from the slower storage media (e.g., the storage pools 218). The I/O bus may have limited bandwidth and speed.

In one implementation, the I/O layer 216 schedules an order of the performance of reads within the I/O request queue 1000 or similar data structure. For example, the requests in the I/O request queue 1000 may be ordered based on a read priority, an order in which the read request was received, and/or the like. The I/O layer 216 may implement first-in-first-out operations, as well as listing in-progress I/O operations where requests for data blocks have been sent to a storage device, but the data block has yet to be returned to the I/O layer 216.

The I/O request queue 1000 may place prioritized requests 1004 ahead of other requests 1002. Read requests may be assigned a priority based on whether the read request is a prefetch or a request for immediate use. A prefetch generally is assigned a lower priority and such prefetch requests 1006 with the other requests 1002. On the other hand, a read may be assigned as one of the prioritized requests 1004. The priority of a given request in the I/O request queue 1000 may be identified with a priority tag. In one implementation, the I/O layer 216 may dynamically update the priority of a request and move the request ahead in the I/O request queue 1000 according to the upgraded priority. For example, where an I/O request has been pending in the I/O request queue 1000 for a preset length of time without fulfillment, the I/O request may be promoted to the prioritized requests 1004.

In one implementation, to generate feedback on resource contention with prefetching, the I/O layer 216 determines whether any of the prefetch requests 1006 have been promoted to prioritized prefetch requests 1008. The goal of prefetch is to allow slower storage media, such as disks, to deliver maximum throughput. By the time the I/O request queue 1000 has formed on each disk at a certain size expressed in seconds of activity, there is no benefit to increasing subsequent prefetch windows further as each disk is already operating to it maximum bandwidth. In one implementation, when the prefetch requests 1006 are being promoted as the prioritized prefetch requests 1008, prefetching may be globally throttled.

As a number of access streams are increased, an amount of prefetch requests are issued, each up to the maximum prefetch window. For example, for a maximum prefetch window of 32 MB, approximately 4096 I/O requests may be issued for an 8 KB record. If the slower storage media is busy and cannot consume the I/O requests in the I/O request queue 1000 faster than they arrive, the I/O requests may sit in the I/O request queue for several seconds before being sent to the slower storage media. The prefetch requests 1006 may have a deadline of a preset number of seconds (e.g., 3.8 seconds) after insertion in to the I/O request queue 1000. After the deadline passes, the prefetch requests are promoted to the prioritized prefetch requests 1008, which have the same priority as other I/O requests past their deadlines. As such, the prioritized prefetch requests 1008 compete with other prioritized prefetch requests 1004.

In one implementation, where the prioritized requests 1004 include the prioritized prefetch requests 1008, prefetch is globally throttled, for example, by decreasing a maximum size of a prefetch window based on a scale of the overage in I/O requests. Stated differently, the prefetch may be throttled by adjusting the maximum size of the prefetch window by a scale of the amount of the prioritized prefetch requests 1008.

Figure 11:
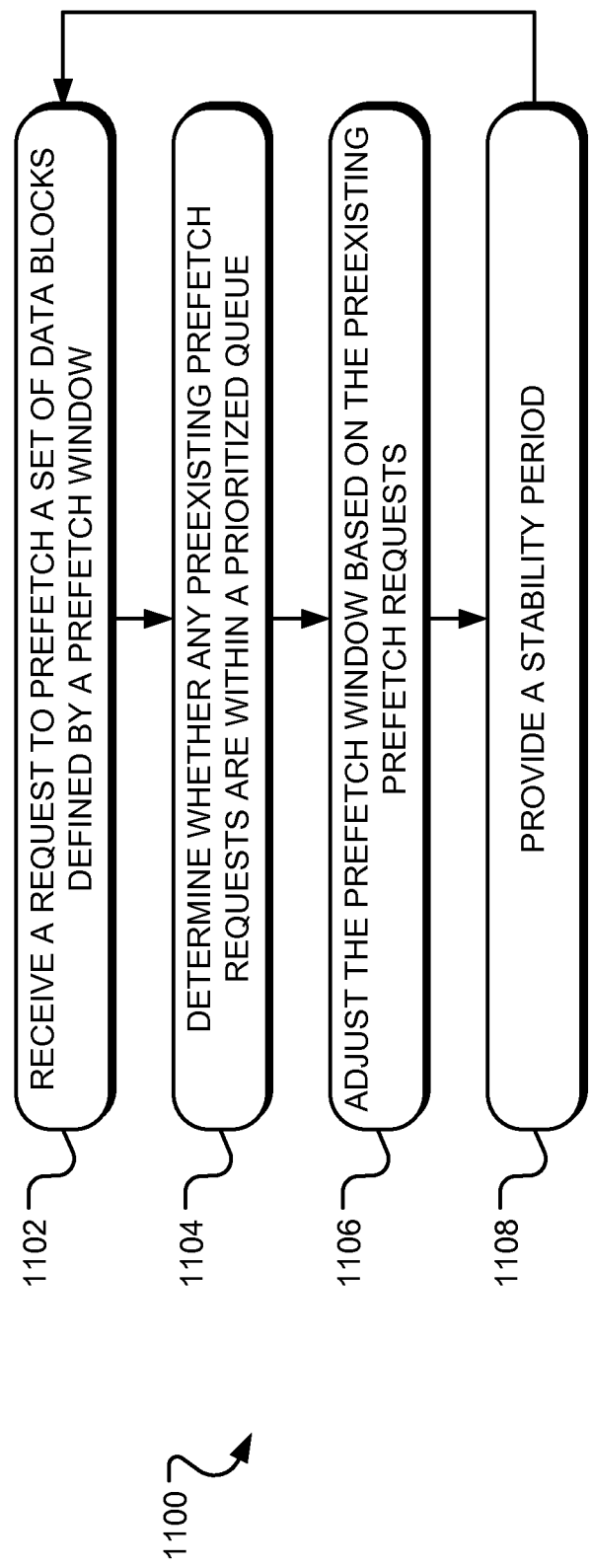
FIG. 11 illustrates example operations for adaptive prefetching based on an input/output queue overage.

FIG. 11 illustrates example operations 1100 for adaptive prefetching based on an input/output queue overage. In one implementation, an operation 1102 receives a request to prefetch a set of data blocks defined by a prefetch window, and an operation 1104 determines whether any existing prefetch requests are within a prioritized I/O queue. An operation 1106 adjusts the prefetch window based on the preexisting prefetch requests. For example, where the prioritized I/O queue includes prioritized prefetch requests, the prefetch window may be scaled accordingly. An operation 1108 provides a stability period to assess an impact of the operation 1106 on resource contention. The operations 1104-1108 may be repeated with each repeat of the operation 1102.

Figure 12:
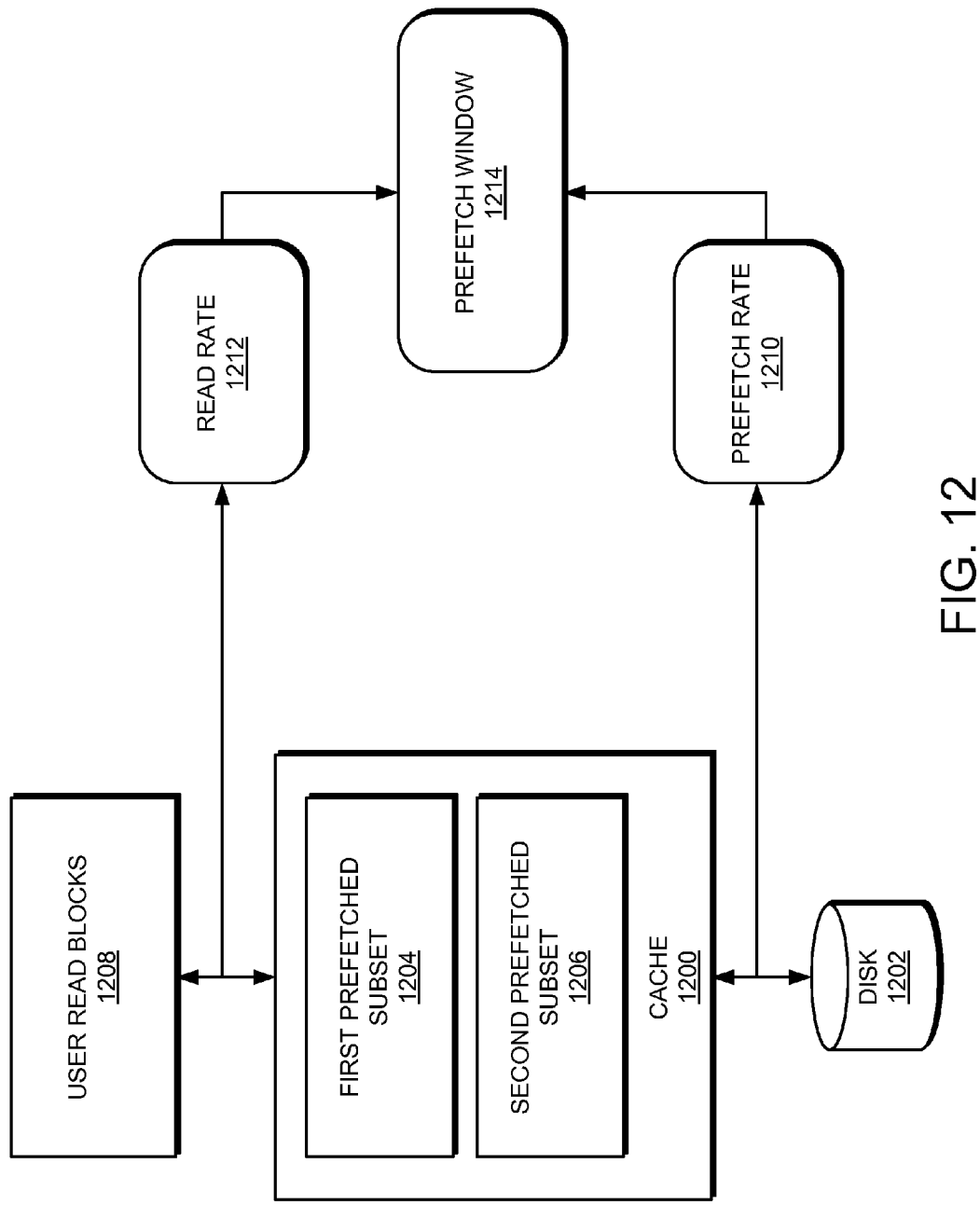
FIG. 12 shows an example storage system for adaptive prefetching based on a read rate and a prefetch rate.

Turning to FIG. 12, an example storage system for adaptive prefetching based on a read rate and a prefetch rate is shown. In one implementation, prefetched data is moved from slower storage media, such as one or more disks 1202, to faster storage media, such as cache 1200. A first prefetched subset 1204 and a second prefetched subset 1206 are moved in the cache 1200 from the disks 1202, as described herein. Each of these blocks are accessed from the cache 1200 as user read blocks 1208 as part of a sequential access stream.

In one implementation, the first trigger associated with the first prefetched subset 1204 and the second trigger associated with the second prefetched subset 1206 are used to dynamically set a prefetch window 1214 associated with a third trigger. As discussed herein, a prefetch window size associated with the first trigger and a prefetch window size associated with the second trigger were defined prior to the first prefetch subset 1204 and the second prefetched subset 1206 from being moved into the cache 1200. Using the prefetch window size and a time to move each of the blocks in the window size into the cache 1200, a prefetch rate 12010 may be calculated. As the user read blocks 1208 are accessed, a read rate 1212 is calculated. Comparing the read rate 1212 to the prefetch rate 1210, it may be determined when the read rate 1212 will catch up to the prefetch rate 1210. In one implementation, a time, t, may be calculated for when the read rate 1212 will catch up to the prefetch rate 1210 using the following formula: $t=(x2-x1)/(r-p)$, where r is the read rate 1212, p is the prefetch rate 1210, x1 is the block at which reading begins, and x2 is the block at which prefetching begins. Using this formula, it may be determined that if the read rate 1212 is half of the prefetch rate 1210, the prefetch window 1214 is sized for the prefetching to sufficiently stay ahead of the reads. On the other hand, if the read rate 1212 will never catch up to the prefetch rate 1210, the size of the prefetch window 1214 may be decreased, for example, by halve. Similarly, if the read rate 1212 will quickly catch up to the prefetch rate 1210, the size of the prefetch window 1214 may be increased, for example, by double. Based on this comparison of the read rate 1212 to the prefetch rate 1210, the prefetch window 1214 may be dynamically adjusted for each trigger.

Figure 13:
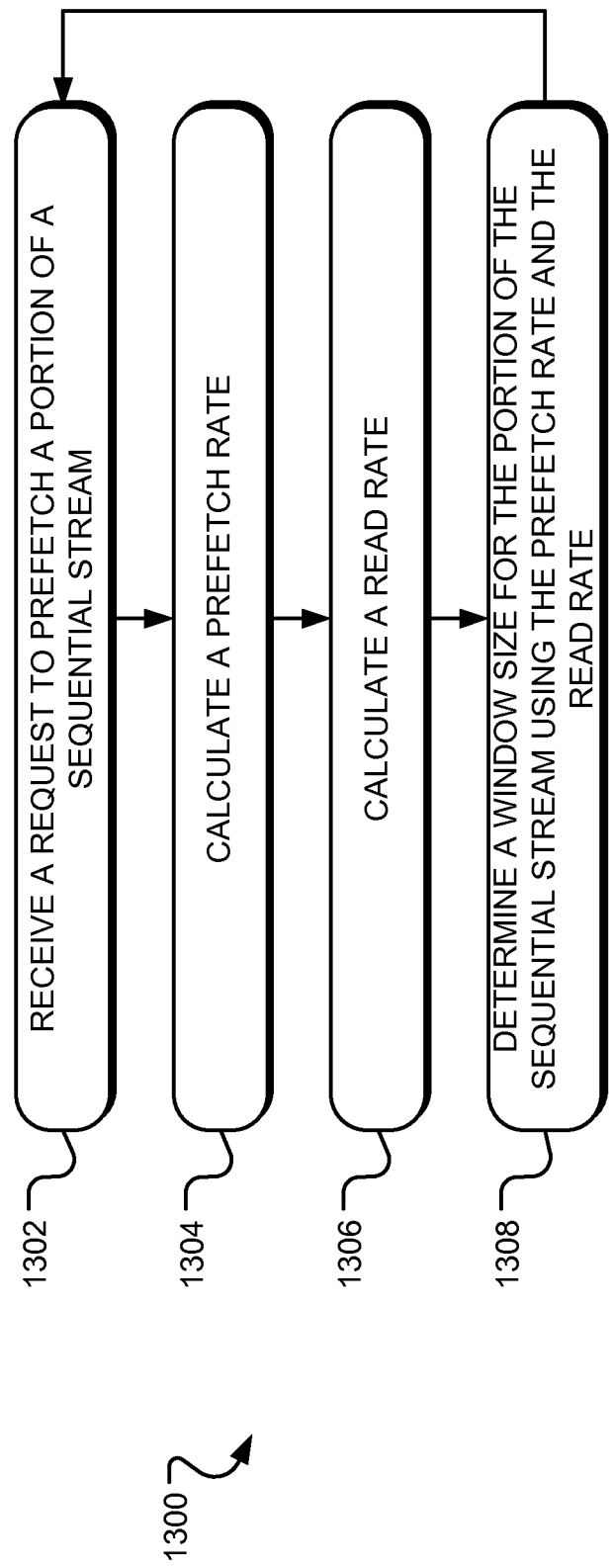
FIG. 13 illustrates example operations for adaptive prefetching based on a read rate and a prefetch rate.

FIG. 13 illustrates example operations 1300 for adaptive prefetching based on a read rate and a prefetch rate. In one implementation, an operation 1302 receives a request to prefetch a portion of a sequential stream. An operation 1304 calculates a prefetch rate for the sequential stream, and an operation 1306 calculates a read rate for the sequential stream. Using the prefetch rate and the read rate, an operation 1308 determines a prefetch window size for the portion of the sequential stream. In one implementation, the operation 1308 averages the read and prefetch rates over several triggers to address any anomalies.

Figure 14:
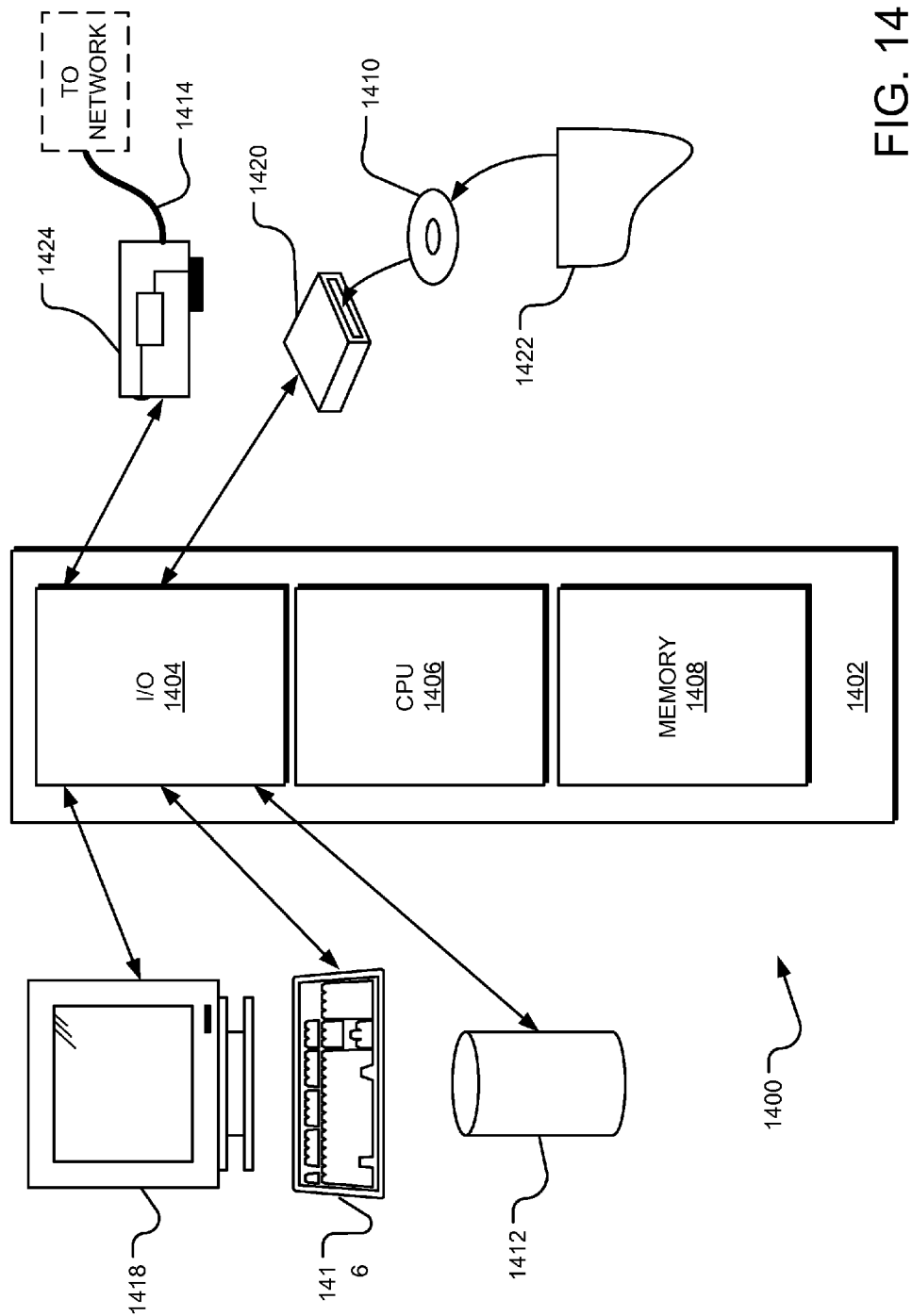
FIG. 14 is an example computing system that may implement various systems and methods of the presently disclosed technology.

Referring to FIG. 14, a detailed description of an example computing system 1400 having one or more computing units that may implement various systems and methods discussed herein is provided. The computing system 1400 may be applicable to the storage devices 102-104, the file system 200, the user devices 112-114, and/or other computing devices. It will be appreciated that specific implementations of these devices may be of differing possible specific computing architectures not all of which are specifically discussed herein but will be understood by those of ordinary skill in the art.

The computer system 1400 may be a general computing system is capable of executing a computer program product to execute a computer process. Data and program files may be input to the computer system 1400, which reads the files and executes the programs therein. Some of the elements of a general purpose computer system 1400 are shown in FIG. 14 wherein a processor 1402 is shown having an input/output (I/O) section 1404, a Central Processing Unit (CPU) 1406, and a memory section 1408. There may be one or more processors 1402, such that the processor 1402 of the computer system 1400 comprises a single central-processing unit 1406, or a plurality of processing units, commonly referred to as a parallel processing environment. The computer system 1400 may be a conventional computer, a distributed computer, or any other type of computer, such as one or more external computers made available via a cloud computing architecture. The presently described technology is optionally implemented in software devices loaded in memory 1408, stored on a configured DVD/CD-ROM 1410 or storage unit 1412, and/or communicated via a wired or wireless network link 1414, thereby transforming the computer system 1400 in FIG. 14 to a special purpose machine for implementing the described operations.

The I/O section 1404 is connected to one or more user-interface devices (e.g., a keyboard 1416 and a display unit 1418), a disc storage unit 1412, and a disc drive unit 1420. In the case of a tablet or smart phone device, there may not be a physical keyboard but rather a touch screen with a computer generated touch screen keyboard. Generally, the disc drive unit 1420 is a DVD/CD-ROM drive unit capable of reading the DVD/CD-ROM medium 1410, which typically contains programs and data 1422. Computer program products containing mechanisms to effectuate the systems and methods in accordance with the presently described technology may reside in the memory section 1404, on a disc storage unit 1412, on the DVD/CD-ROM medium 1410 of the computer system 1400, or on external storage devices made available via a cloud computing architecture with such computer program products, including one or more database management products, web server products, application server products, and/or other additional software components. Alternatively, a disc drive unit 1420 may be replaced or supplemented by an optical drive unit, a flash drive unit, magnetic drive unit, or other storage medium drive unit. Similarly, the disc drive unit 1420 may be replaced or supplemented with random access memory (RAM), magnetic memory, optical memory, and/or various other possible forms of semiconductor based memories commonly found in smart phones and tablets.

The network adapter 1424 is capable of connecting the computer system 1400 to a network via the network link 1414, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 1400 is connected (by wired connection or wirelessly) to a local network through the network interface or adapter 1424, which is one type of communications device. When used in a WAN-networking environment, the computer system 1400 typically includes a modem, a network adapter, or any other type of communications device for establishing communications over the wide area network. In a networked environment, program modules depicted relative to the computer system 1100 or portions thereof, may be stored in a remote memory storage device. It is appreciated that the network connections shown are examples of communications devices for and other means of establishing a communications link between the computers may be used.

In an example implementation, prefetching software, prefetched data, a plurality of internal and external databases, source databases, and/or cached data on servers are stored as the memory 1408 or other storage systems, such as the disk storage unit 1412 or the DVD/CD-ROM medium 1410, and/or other external storage devices made available and accessible via a network architecture. Network outage tracker software and other modules and services may be embodied by instructions stored on such storage systems and executed by the processor 1402.

Some or all of the operations described herein may be performed by the processor 1402. Further, local computing systems, remote data sources and/or services, and other associated logic represent firmware, hardware, and/or software configured to control operations of the prefetching, the storage devices 102-104, the user devices 112-114, and/or other computing units or components of the storage system 100. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1402 and a user may interact with a GUI using one or more user-interface devices (e.g., the keyboard 1416, the display unit 1418, and the user devices 112-114) with some of the data in use directly coming from online sources and data stores. The system set forth in FIG. 14 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for prefetching data, the method comprising:
   determining whether a read request for a first data block issued from a user device and received at a file system of a storage device over a network is part of a sequential access stream;
   recording a first trigger for a second data block in the sequential access stream;
   determining that the first trigger is satisfied;
   prefetching, based on determining that the first trigger is satisfied, a first set of data blocks from slower storage media of the storage device to faster storage media of the storage device, the first set of data blocks defined by a first prefetch window associated with the first trigger;
   recording a second trigger for a third data block in the sequential access stream;
   determining that the second trigger is satisfied;
   determining, based on determining that the second trigger is satisfied, a second prefetch window, wherein a size of the second prefetch window is determined based on the first trigger being satisfied;
   modifying the second prefetch window to create a modified second prefetch window based on resource contention in the storage device; and
   prefetching, based on determining that the second trigger is satisfied, a second set of data blocks from the file system of the slower storage media to the faster storage media, the second set of data blocks defined by the modified second prefetch window.

2. The method of claim 1, wherein the second prefetch window is larger than the first prefetch window.

3. The method of claim 2, wherein the second prefetch window is larger than the first prefetch window by a factor of 2.

4. The method of claim 1, wherein the first trigger and the second trigger are recorded in a hash table stored in the faster storage media.

5. The method of claim 1, wherein the second data block is next sequentially in the sequential access stream following the first data block.

6. The method of claim 1, wherein whether the read request for the first data block is part of the sequential access stream is determined by at least one of comparing a block identifying information for the first data block to a hash table comprising a plurality of triggers or locating the first data block in the faster storage media.

7. The method of claim 6, wherein the first data block is determined to be part of the sequential access stream where the block identifying information matches one of the plurality of triggers.

8. The method of claim 6, wherein the plurality of triggers are evicted from the faster storage media based on a least recently used trigger list.

9. The method of claim 8, wherein a least recently used trigger list is consulted after a first predefined time and each of the plurality of triggers evicted from the faster storage media after a second predefined time.

10. The method of claim 9, wherein the first predefined time is two seconds and the second predefined time is ten seconds.

11. The method of claim 1, wherein the faster storage media is cache and the slower storage media includes one or more disks.

12. The method of claim 1, wherein the third data block is at a beginning of the first prefetch window.

13. The method of claim 1, wherein a size of the first prefetch window and a size of the second prefetch window are limited by a maximum prefetch window size.

14. The method of claim 13, wherein the maximum prefetch window size is 32 MB.

15. A method for prefetching data, the method comprising:

receiving a request to prefetch a first set of data blocks defined by a prefetch window to faster storage media in a storage device from slower storage media in the storage device, the request being associated with a read request from a user device to a file system of the storage device over a network for a data block having a trigger associated with the prefetch window;

modifying a size of the prefetch window based on a resource contention in the storage device to form a modified prefetch window;

prefetching a second set of data blocks from the file system of the slower storage media to the faster storage media, the second set of data blocks being defined by the modified prefetch window, wherein the second set of data blocks includes one or more data blocks from the first set of data blocks;

determining, during a stability period, an impact of the prefetching.

16. The method of claim 15, wherein the resource contention includes a capacity threshold for a most recently used state maintaining prefetched data, and the size of the prefetch window is modified when the capacity threshold is exceeded.

17. The method of claim 16, wherein the capacity threshold is set at ¾ of a capacity of the most recently used state.

18. The method of claim 15, wherein the resource contention includes detecting a presence of prefetch input/output requests in a prioritized input/out queue.

19. The method of claim 15, wherein the resource contention includes detecting a prefetch rate and a read rate.

20. The method of claim 19, wherein the size of the prefetch window is maintained where the read rate is less than the prefetch rate but greater than half of the prefetch rate.

* * * * *

UNITED STATES PATENT AND TRADEMARK OFFICE
CERTIFICATE OF CORRECTION

PATENT NO. : 9,990,296 B2
APPLICATION NO. : 14/815636
DATED : June 5, 2018
INVENTOR(S) : Ross et al.

Page 1 of 1

It is certified that error appears in the above-identified patent and that said Letters Patent is hereby corrected as shown below:

In Column 5, Line 36, delete "(e.g., 0- -1- -2- -3- -4 . . . )," and insert -- (e.g., 0--1--2--3--4 . . . ), --, therefor.

In Column 9, Line 24, delete "a a" and insert -- a --, therefor.

Signed and Sealed this
Twenty-ninth Day of January, 2019

Andrei Iancu
*Director of the United States Patent and Trademark Office*